June 7, 1927.  A. HEURUNG  1,631,866
APPARATUS FOR PRODUCING AND PROJECTING CINEMATOGRAPHIC PICTURES
Filed Feb. 18, 1926   2 Sheets-Sheet 1
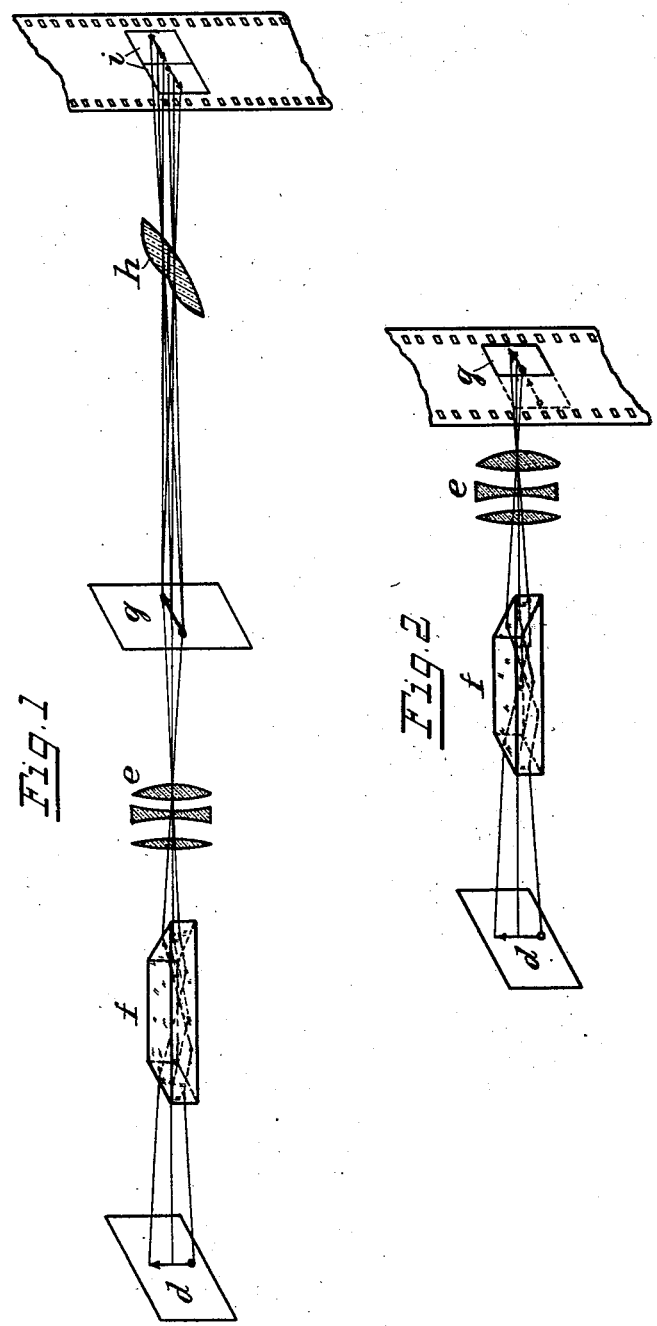
Anton Heurung
INVENTOR
By Otto ...
his Atty.

June 7, 1927.
A. HEURUNG
1,631,866
APPARATUS FOR PRODUCING AND PROJECTING CINEMATOGRAPHIC PICTURES
Filed Feb. 18, 1926   2 Sheets-Sheet 2
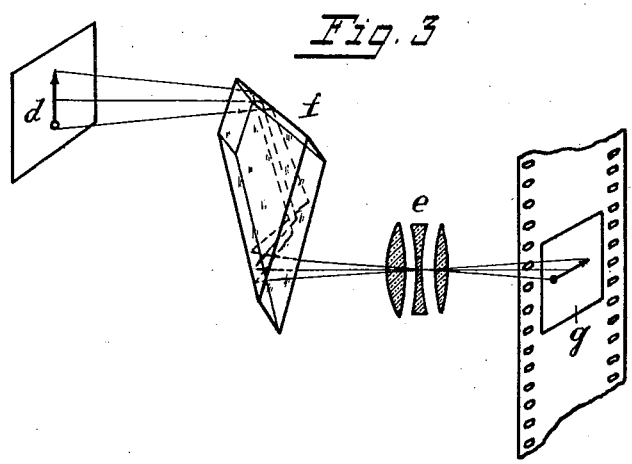
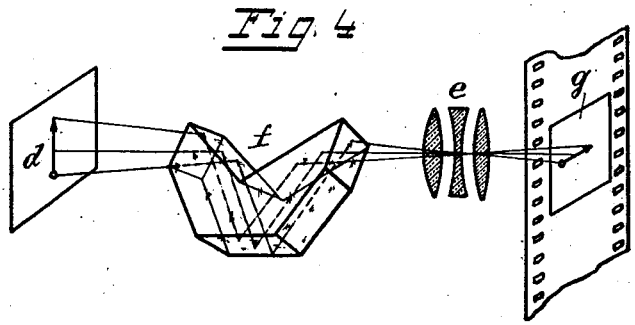
ANTON HEURUNG
INVENTOR
By
his ATTY.

Patented June 7, 1927.

1,631,866

UNITED STATES PATENT OFFICE.

ANTON HEURUNG, OF MUNICH, GERMANY.

APPARATUS FOR PRODUCING AND PROJECTING CINEMATOGRAPHIC PICTURES.

Application filed February 18, 1926, Serial No. 89,000, and in Germany June 23, 1924.

For producing and projecting cinematographic pictures in natural colors it has been proposed to use lenses placed side by side, so that they split up, into exactly equal parts, an image produced by an objective, or that they re-compose a picture from such parts. If with such apparatus a single ordinary film is used, it has been usual to make the parts of the standard dimensions of 18 x 24 mm., or else to reduce the size so that the sum of their heights equals the height of the film picture. In the former case the steps by which the film advances must be doubled; in the latter case the partial pictures are very small.

In order to combine two partial pictures (as for example for colored photography) within the area of 18 x 24 mm., with the sides in the proper ratio of 3:4 and the pictures as large as possible, a special optical device may be disposed in the path of the rays in the photographing or projecting camera, this device serving to turn the picture through 90°, so that an image or picture lying on its side is turned upright. Even for black and white photography with pictures of the normal size, or at any rate of proportional dimensions, it is sometimes convenient to turn the pictures through 90°. For this purpose mirror and prism systems have been used to reflect the rays in three directions perpendicular to each other. These systems are comparatively complicated and have some defects.

My invention provides substantially simpler means for turning the pictures.

To this end I arrange in the path of the rays between the film and the subject or screen a prism or mirror system of the kind used for so called picture erection. The path of the main beam or ray of the optical axis of the objective enters, passes through, and leaves the said element in a single plane. As the important feature of my invention I so place this optical element that the plane defined by the path of the ray to, through, and from the optical element, is at an angle of 45° to the plane defined by the optical axis of the objective and the axis of the film. In practice, this last mentioned plane is vertical or horizontal. All the refracting and reflecting surfaces are perpendicular to this last mentioned plane; the issuing beam is either in line with the entering beam, or has undergone parallel displacement, and can then be shifted into alignment by means of an auxiliary mirror system.

Apparatus for this purpose is very convenient in use, and is also easy to construct. In general all the surfaces are total reflection surfaces, and the prisms can generally be made in one piece.

The invention is illustrated diagrammatically and in perspective in the accompanying drawing, in which each figure shows a different example, the lenses being shown in section, for clearness.

In Figs. 1 and 2 the reclining rectangle $d$ is in the object room and would by the objective $e$ be reproduced as a reclining rectangle. However, by the inserted so-called erecting prism system $f$, which operates as a rotating prism, the reclining rectangle $d$ is converted into an upright rectangle $g$. In this prism system the reflection plane and also the plane in which the refractions and the reflection of the axial ray occur are at an angle of 45° to the horizontal. The arrows in the drawing make the effect clear.

Fig. 1 shows a system of twin lenses $h$, whereby the upright image $g$ is split up into two upright, similar and associated partial pictures on the film.

Fig. 2 shows the erect image $g$ projected on one side of the centre line of the film.

Instead of the erecting prism $f$ shown in Figs. 1 and 2, I may use any other prism or mirror system which is adapted to erect the image or picture and has the characteristic that are deflections, that is, reflections and refractions of the main beam or ray occur in the same plane, the system being so disposed in the path of the rays that the said plane, into which the principal ray falls, is at an angle of 45° to the horizontal.

Figs. 3 and 4 show examples of other prism or mirror systems for carrying out the principle of the invention.

What I claim as my invention and desire to secure by Letters Patent of the United States is:—

1. A cinematographic apparatus including a cinematographic film, an objective, an erecting prism the entering and emerging rays of which are coaxial, said prism being disposed with its longitudinal axis on the axis of the objective, and all of its deflecting surfaces at right angles to a plane which includes the optical axis, and which plane is at an angle of 45° to a plane defined by the optical axis and the longitudinal axis of the film.

2. A cinematographic apparatus including a cinematographic film, an objective, and an optical element for turning the image through 90°, said element having a plurality of light deflecting surfaces all at right angles to a single plane including the path of the main ray of the optical axis of the objective to, through and from said element, and said plane being disposed at an angle of 45° to a plane defined by the optical axis and the longitudinal axis of the film.

In witness whereof I have signed this specification.

ANTON HEURUNG.